(12) United States Patent
Kataoka (10) Patent No.: US 7,518,965 B2
(45) Date of Patent: Apr. 14, 2009

(54) REDUCED THICKNESS OPTICAL PICKUP DEVICE WITH CONTACT AVOIDING PART FOR AVOIDING CONTACT BETWEEN OPENING-REGULATING FILTER AND TURNING MIRROR

(75) Inventor: Makoto Kataoka, Mihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 649 days.

(21) Appl. No.: 11/149,778

(22) Filed: Jun. 9, 2005

(65) Prior Publication Data

US 2005/0276197 A1    Dec. 15, 2005

(30) Foreign Application Priority Data

Jun. 9, 2004    (JP)    ............................ 2004-171526

(51) Int. Cl.
*G11B 7/00*    (2006.01)
(52) U.S. Cl. ................................... 369/53.19
(58) Field of Classification Search ......................... None
See application file for complete search history.

(56) References Cited

U.S. PATENT DOCUMENTS 5,734,637 A * 3/1998 Ootaki et al. .......... 369/112.02

6,683,732 B2 * 1/2004 Maeda et al. ............... 359/811

FOREIGN PATENT DOCUMENTS

| JP | 11-161997 | 6/1999 |
|---|---|---|
| JP | 2001-319342 | 11/2001 |
| JP | 2002-216380 | 8/2002 |
| JP | 2003-346368 | 12/2003 |
| JP | 2004-005822 | 1/2004 |
| JP | 2004-005910 | 1/2004 |
| JP | 2004-310966 | 11/2004 |

* cited by examiner

*Primary Examiner*—Joseph Feild
*Assistant Examiner*—Joseph Haley
(74) *Attorney, Agent, or Firm*—Morrison & Foerster LLP (57) ABSTRACT

An optical pickup device comprising: a tilting mechanism for tilting an objective lens in accordance with tilt of an optical information disc disposed above the objective lens; a wavelength-selecting opening-regulating filter disposed immediately below the objective lens and moving integrally with the objective lens; and a turning mirror for guiding light beams from a light source toward the opening-regulating filter, wherein a stopper for regulating an amount of downward movement of a holder for holding the objective lens and the opening-regulating filter is provided in the vicinity of a plane including the axis of tilting operation of the tilting mechanism and center of the objective lens and at substantially the same height level as that of the opening-regulating filter, and at least one of the opening-regulating filter and the turning mirror has a contact avoiding part for avoiding contact between the opening-regulating filter and the turning mirror.

3 Claims, 10 Drawing Sheets

REDUCED THICKNESS OPTICAL PICKUP DEVICE WITH CONTACT AVOIDING PART FOR AVOIDING CONTACT BETWEEN OPENING-REGULATING FILTER AND TURNING MIRROR

CROSS-REFERENCE TO RELATED APPLICATION

This application is related to Japanese application No.2004-171526 filed on Jun. 9, 2004 whose priority is claimed under 35 USC §119, the disclosure of which is incorporated by reference in its entirety.

BACKGROUND OF THE INVENTION

1. Field of the Invention

The present invention relates to an optical pickup device which is thinner than conventional ones. The optical pickup device of the present invention is suitably mounted on a notebook-sized personal computer particularly demanding a thin optical pickup device.

2. Description of Related Art

Figure 9A:
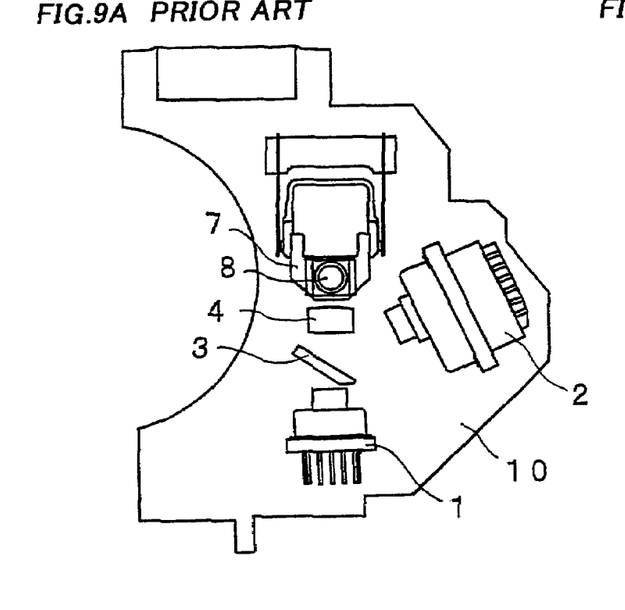
FIGS. 9A, 9B and 9C are a plan view, a side view and a front view, respectively, showing a structure of a conventional optical pickup device.
Figure 9B:
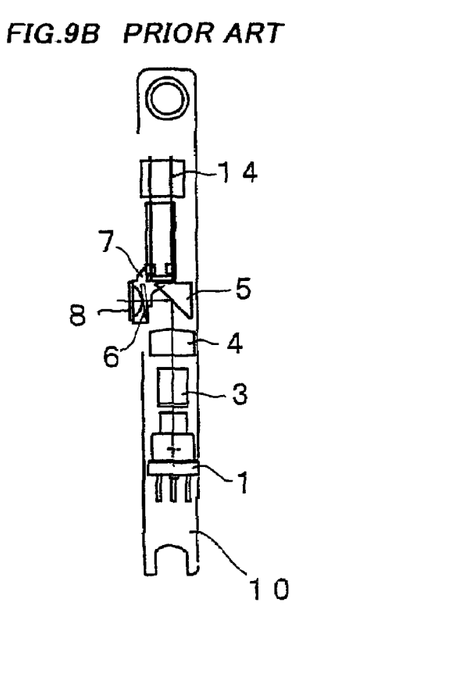
Figure 9C:
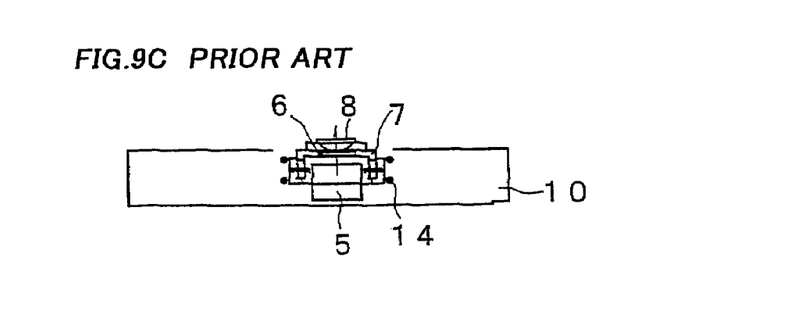
Figure 10A:
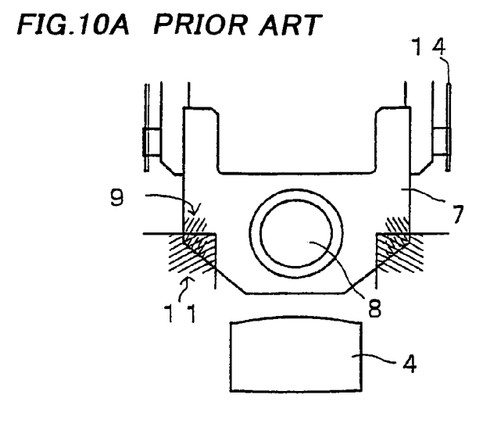
FIGS. 10A, 10B and 10C are a plan view, a side view and a front view, respectively, showing a turning mirror portion of the optical pickup device of FIGS. 9A to 9C in an enlarged manner.
Figure 10B:
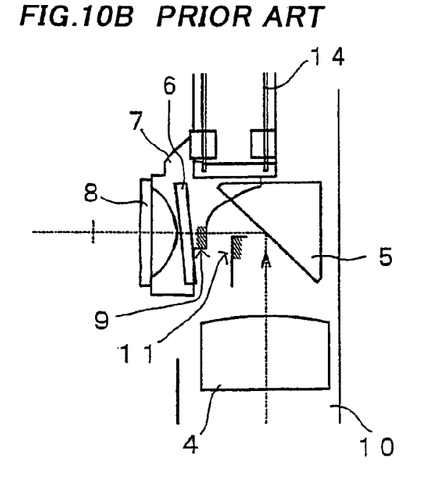
Figure 10C:
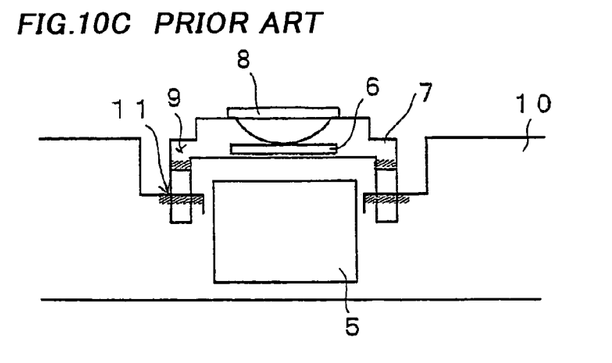

FIGS. 9A to 9C are top views showing a structure of a conventional optical pickup device adapted to a plurality of different recording media such as CD and DVD. FIGS. 10A to 10C are enlarged views of a portion of a turning mirror in the conventional optical pickup device.

The optical pickup device comprises, as shown in FIGS. 9A to 9C, two light sources 1 and 2 having different wavelengths, a beam splitter 3 for adjusting the optical axes of light beams generated by the light sources 1 and 2 to coincide, a collimate lens 4 for converting the beams into parallel beams, a turning mirror 5 for turning the optical axis of the parallel beams by about 90 degrees, an opening-regulating filter 6 having a flat plate shape and wavelength selectivity, and an objective lens 8 for forming a condensed beam spot on a data surface of an optical information disc to record, reproduce and erase data.

As described in JP-A 11-161997 (1999), the opening-regulating filter 6 is disposed immediately below the objective lens 8 in a lens holder 7 to obtain an optimum condensed beam spot in each of a plurality of kinds of media for beams with different wavelengths and having different substrate thicknesses by using a single objective lens 8.

The holder 7 for holding the objective lens 8 is supported by elastic members 14 forming a parallel link and is controlled by a focusing mechanism (height direction) (not shown) and a tracking mechanism (radial direction of an optical information disc) (not shown) so that a condensed spot is continuously formed on a data surface, even when there occurs decentering or a face run-out of the optical information disc.

In particular, in DVD and following discs of recent years, as the packing density and precision of an optical information disc is becoming higher, it is necessary to condense a light beam to an extremely small spot. An optical system in which the wavelength of a laser beam is shortened to 670 nm or less and the numerical aperture (N.A.) of the objective lens is set to 0.6 or larger is employed.

The size of coma aberration which occurs in a condensed beam spot is proportional to the third power of the numerical aperture of the objective lens 8, the size of astigmatism is proportional to the square of the numerical aperture of the objective lens 8, and both of them are proportional to the inverse of the wavelength. Consequently, there is a problem such that the influence of the tilt of an optical information disc becomes serious due to shortening of the wavelength and increase in the numerical aperture.

In order to solve the problem, an objective lens tilting mechanism (not shown) is employed to tilt the objective lens 8 in the same direction as the tilt of an optical information disc to maintain a small aberration of a condensed beam spot.

In the high-precision optical pickup device of this kind, to obtain a required fine condensed spot, usually, optical glass or crystal member is used for both of the opening-regulating filter 6 and the turning mirror 5 from the viewpoint of precision.

As understood from the enlarged views of FIGS. 10A to 10C, to reduce the thickness of the optical pickup device, it is sufficient to reduce the interval between the turning mirror 5 and the opening-regulating filter 6. However, when the interval is narrowed, both of the parts may come into contact with each other, for example, in the case such that spontaneous disturbance occurs in lens position control or a spot is forcedly condensed on an optical information disc which is out of specification. In this case, a problem occurs such as break, chipping, or irregularity in mounting precision.

In order to solve the problem, a mechanism is employed which prevents the turning mirror 5 and the opening-regulating filter 6 from coming into contact with each other by providing a stopper 9 for the holder 7 and providing a stopper receiver 11 for a housing 10 as a casing of the optical pickup. Another embodiment of the stopper receiver is disclosed in JP-A 2001-319342.

The conventional stopper 9 is usually provided at each of two corners of the holder 7 as shown in FIGS. 10A to 10C. Consequently, a height space expressed by $(h)=(W/2)SIN(\theta)$ where $(\theta)$ denotes the angle of tilt by tilting operation and W denotes width of the holder 7 is necessary, and it hinders reduction in thickness of the optical pickup device.

SUMMARY OF THE INVENTION

The present invention has been achieved in consideration of such circumstances and provides an optical pickup device realizing reduction in thickness.

The present invention provides an optical pickup device which comprises a tilting mechanism for tilting an objective lens in accordance with tilt of an optical information disc disposed above the objective lens, a wavelength-selecting opening-regulating filter (hereinafter referred to as "opening-regulating filter") disposed immediately below the objective lens and moving integrally with the objective lens, and a turning mirror for guiding light beams from a light source toward the opening-regulating filter. Herein, a stopper for regulating an amount of downward movement of a holder for holding the objective lens and the opening-regulating filter is provided in the vicinity of a plane including the axis of tilting operation of the tilting mechanism and center of the objective lens and at substantially the same height level as that of the opening-regulating filter, and at least one of the opening-regulating filter and the turning mirror has a contact avoiding part for avoiding contact between the opening-regulating filter and the turning mirror.

According to the optical pickup device of the present invention, a stopper is provided in the vicinity of a plane including the axis of tilting operation and the center of an objective lens and at substantially the same height level as the opening-regulating filter, so that an amount of downward movement of the stopper during the tilting operation is decreased. Therefore, a height space for the tilting operation which is needed in the conventional configuration is unnecessary. In the optical pickup device of the present invention, the opening-regulating filter or the turning mirror has a contact avoiding part for avoiding contact between the opening-regulating filter and the turning mirror. Consequently, even when the holder tilting operation is performed, the opening-regulating filter and the turning mirror do not come into contact with each other.

In the present invention, since both of the configurations are provided, the interval between the opening-regulating filter and the turning mirror can be shortened in comparison with the conventional configuration. Therefore, the present invention provides an optical pickup device realizing reduction in thickness.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

The present invention provides an optical pickup device which comprises a tilting mechanism for tilting an objective lens in accordance with tilt of an optical information disc disposed above the objective lens, a opening-regulating filter disposed immediately below the objective lens and moving integrally with the objective lens, and a turning mirror for guiding light beams from a light source toward the opening-regulating filter. Herein, a stopper for regulating an amount of downward movement of a holder for holding the objective lens and the opening-regulating filter is provided in the vicinity of a plane including the axis of tilting operation of the tilting mechanism and center of the objective lens and at substantially the same height level as that of the opening-regulating filter, and at least one of the opening-regulating filter and the turning mirror has a contact avoiding part for avoiding contact between the opening-regulating filter and the turning mirror.

The present invention also provides an optical pickup device which comprises an objective lens, a opening-regulating filter disposed immediately below the objective lens, a holder for holding the objective lens and the opening-regulating filter, a tilting mechanism for tilting the holder in accordance with tilt of an optical information disc disposed above the objective lens, a focusing mechanism for vertically moving the holder in accordance with vertical fluctuations of the optical information disc, a turning mirror for guiding light beams from a light source toward the opening-regulating filter, and a housing for holding the turning mirror. Herein, the holder has a stopper for regulating an amount of downward movement of the holder in the vicinity of a plane including the axis of tilting operation of the tilting mechanism and center of the objective lens and at substantially the same height level as that of the opening-regulating filter, the housing has a stopper receiver which is paired with the stopper, and at least one of the opening-regulating filter and the turning mirror has a contact avoiding part for avoiding contact between the opening-regulating filter and the turning mirror.

1. Optical Information Disc

An optical pickup device of the present invention is mounted suitably on an electronic apparatus capable of recording/reproducing information to/from both of a CD and a DVD. Herein, therefore, the optical information disc is CD, DVD or the like. An optical information disc is preferably medium-rotating-type such as CD, DVD or the like.

2. Tilting Mechanism

A tilting mechanism tilts an objective lens in accordance with a tilt of an optical information disc disposed above an objective lens. More specifically, the tilting mechanism turns a holder which holds the objective lens and a opening-regulating filter around the axis of tilting operation to thereby tilt the objective lens and the opening-regulating filter. The "axis of the tilting operation" denotes the axis of the tilting operation in a state where the focusing or tracking operation is not performed. The "axis" is an axis connecting two stationary points during the tilting operation in the above-described state. For example, when the holder is supported by four elastic members two each on each side, the axis is usually an axis in the center of the four elastic members.

As the tilting mechanism, various known ones disclosed in, for example, JP-A 2002-216380, JP-A 2003-346368, JP-A 2004-5822 and JP-A 2004-5910 can be used. The disclosure of these publications is incorporated by reference on its entirety.

The optical pickup device of the present invention usually further comprises a focusing mechanism for vertically moving the holder in accordance with vertical fluctuations of the optical information disc.

3. Opening-Regulating Filter

A opening-regulating filter is disposed immediately below the objective lens and moves integrally with the objective lens. By disposing the opening-regulating filter in the position, a single lens can be adapted to a plurality of laser wavelengths or substrate thicknesses of the optical information discs. The opening-regulating filter preferably has a plate shape. Examples of the opening-regulating filter are shown in JP-A 11-161997 (1999), and the disclosure of the publication is incorporated by reference on its entirety. However, the opening-regulating filter of the invention is not limited to the examples shown in the publication above, but may be any of other filters functioning in the same manner.

The optical pickup device of the present invention may comprise a 1/4λ deflection phase difference filter in place of the opening-regulating filter. In this case, the efficiency of use of laser beams from two light sources can be improved. The optical pickup device of the present invention may comprise a filter having both functions of a opening-regulating filter and a λ/4 phase difference filter in place of the opening-regulating filter. In this case, effects of both of the filters can be obtained.

4. Turning Mirror

The turning mirror guides light beams from the light source toward the opening-regulating filter. The turning mirror usually turns the direction of light beams from the light source by about 90 degrees. The turning mirror is usually held in the housing.

The section of the turning mirror may have a triangle shape or a flat plate shape. When the section of the turning mirror has a triangle shape, the turning mirror is usually fixed to a horizontal plane of the housing which holds the turning mirror. When the turning mirror has a flat plate shape, the turning mirror is fixed to a slope which is inclined, for example, at 45 degrees.

5. Stopper

The stopper regulates an amount of downward movement of the holder for holding the filter. The stopper is usually provided for the holder. The stopper may be formed integrally with the holder or constructed by attaching another member to the holder. A stopper receiver to be paired with the stopper is usually provided for the housing. The stopper receiver is, for example, a flat surface formed in the housing. The stopper comes into collision with the stopper receiver and downward movement of the holder is regulated.

The stopper is provided in the vicinity of a plane including the axis of the tilting operation and the center of the objective lens and at substantially the same height level as the opening-regulating filter. When the stopper is provided in the vicinity of the plane including the axis of the tilting operation and the center of the objective lens, an amount of downward movement of the stopper during the tilting operation is decreased. Therefore, a height space for the tilting operation which is needed in the conventional configuration is unnecessary. When the stopper is provided in a position at substantially the same height level as that of the opening-regulating filter, while preventing collision between the opening-regulating filter and the turning mirror, the thickness of the optical pickup device can be reduced. The "center of the objective lens" denotes an intersecting point between the optical axis of the objective lens and the top face of the objective lens.

6. Contact Avoiding Part

For the opening-regulating filter or the turning mirror, a contact avoiding part for avoiding contact between the opening-regulating filter and the turning mirror is provided. The contact avoiding part is, for example, a cutout or the like formed in the opening-regulating filter or the turning mirror and may have any shape as long as it can avoid contact between them.

The contact avoiding part is, for example, (a) cutouts formed at both corners of an upper end of the turning mirror, (b) cutouts formed at both corners of the opening-regulating filter on the side closer to the upper end of the turning mirror, and (c) both of cutouts formed at both corners of the upper end of the turning mirror and cutouts formed at both corners of the opening-regulating filter on the side closer to the upper end of the turning mirror.

By forming cutouts at both corners closer to the upper end of the turning mirror of the opening-regulating filter and/or the turning mirror, contact between the opening-regulating filter and the turning mirror is avoided. According to the configuration mentioned above the interval between the opening-regulating filter and the turning mirror can be shortened, and the optical pickup device can be thinned. In the case of forming cutouts in both of the opening-regulating filter and the turning mirror, the size of each of the cutouts can be reduced. In this case, optical design is easier since it is easier to avoid an optical restriction.

In the case where the contact avoiding part takes the form of the cutouts (b) or (c), the opening-regulating filter may have a disc shape. In this case, the cutout in the opening-regulating filter may have a circular arc shape.

In the optical pickup device supposed to use a medium-rotating-type optical information disc, the contact avoiding part is, for example, (a) a cutout formed only at the corner on the outer peripheral side of the upper end of a turning mirror, (b) a cutout formed only at the corner on the outer peripheral side of the opening-regulating filter on the side closer to the upper end of the turning mirror, and (c) both of a cutout formed only at the corner on the outer peripheral side of the upper end of the turning mirror and a cutout formed only at the corner on the outer peripheral side of the opening-regulating filter on the side closer to the upper end of the turning mirror.

As will be described in detail in the following embodiments, in an optical pickup device supposed to use a medium-rotating-type optical information disc, the opening-regulating filter and the turning mirror are usually in contact with each other only on the outer peripheral side. Therefore, by providing the contact avoiding part (cutout) only on the outer peripheral side of the opening-regulating filter and/or the turning mirror, the opening-regulating filter and the turning mirror can be manufactured cheaply.

7. Electronic Equipment

The present invention also provides an electronic apparatus comprising the optical pickup device. The electronic apparatus is a notebook-sized personal computer or the like.

Hereinafter, embodiments of the present invention will be described with reference to the drawings.

Figure 1A:
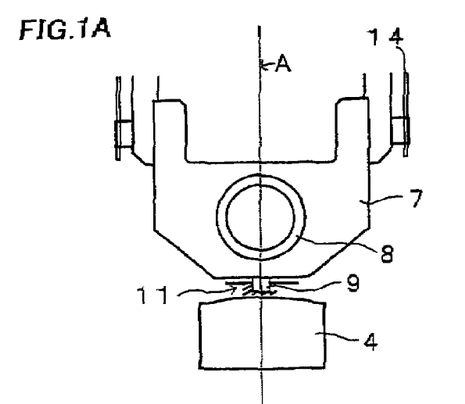
FIGS. 1A, 1B and 1C are a plan view, a side view and a front view, respectively, showing a structure of an optical pickup device according to a first embodiment of the present invention.
Figure 1B:
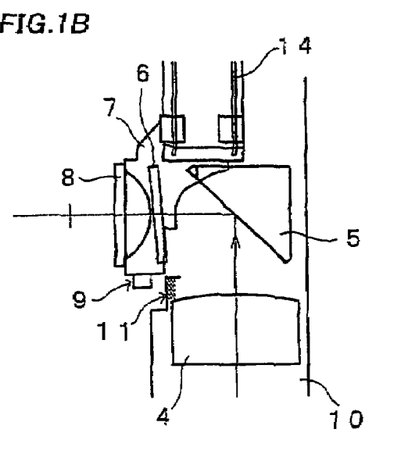
Figure 1C:
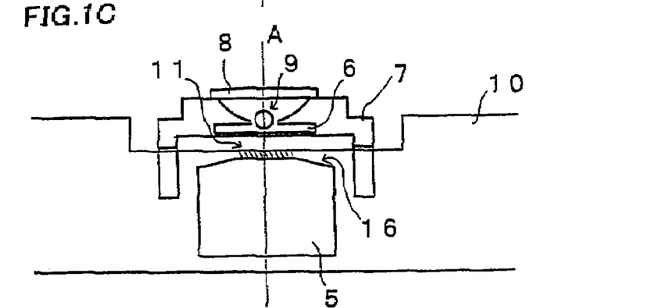

FIGS. 1A to 1C are a top view, a side view and a front view, respectively, showing a structure of an optical pickup device according to a first embodiment of the present invention.

The optical pickup device of the present invention comprises a tilting mechanism (not shown) for tilting an objective lens 8 in accordance with tilt of an optical information disc disposed above the objective lens 8, a opening-regulating filter 6 disposed immediately below the objective lens 8 and moving integrally with the objective lens 8, and a turning mirror 5 for guiding light beams from a light source toward the opening-regulating filter 6. Herein, a stopper 9 for regulating an amount of downward movement of a holder 7 for holding the objective lens 8 and the opening-regulating filter 6 is provided in the vicinity of a plane including the axis of tilting operation of the tilting mechanism and center of the objective lens and at substantially the same height level as that of the opening-regulating filter 6, and at least one of the opening-regulating filter 6 and the turning mirror 5 has a contact avoiding part for avoiding contact between the opening-regulating filter 6 and the turning mirror 5. Beams from the light source are made parallel to each other by the collimate lens 4 and travel toward the turning mirror 5. The turning mirror 5 is held by a housing 10. The housing 10 has the stopper receiver 11 paired with the stopper 9. When the stopper 9 comes into collision with the stopper receiver 11, the downward movement of the holder 7 is regulated. The holder 7 is supported by four elastic members 14. The axis of the tilting operation is the axis of the four elastic members 14. A plane including the axis of the tilting operation by the tilting mechanism and the center of the objective lens is a plane A (plane perpendicular to the sheet surface) of FIGS. 1A and 1C.

Since the stopper 9 is provided in the vicinity of the plane A including the axis of the tilting operation and the center of the objective lens, the amount of downward movement of the stopper 9 during the tilting operation is small. Therefore, different from the conventional structure, the height space for the tilting operation is unnecessary. Since the stopper 9 is provided at substantially the same level as the opening-regulating filter 6, while preventing collision between the opening-regulating filter 6 and the turning mirror 5, the thickness of the optical pickup device can be reduced. Since at least one of the opening-regulating filter 6 and the turning mirror 5 has the contact avoiding part for avoiding contact between the opening-regulating filter 6 and the turning mirror 5, even if the opening-regulating filter 6 and the turning mirror 5 are disposed close to each other, they do not come into contact with each other. In this embodiment, the contact avoiding part is cutouts 16 formed in the turning mirror.

Figure 2A:
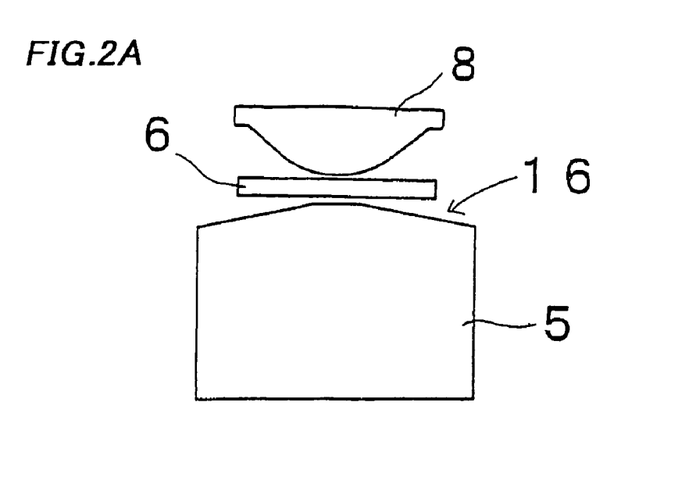
FIGS. 2A and 2B show operation of the optical pickup device according to the first embodiment of the present invention.
Figure 2B:
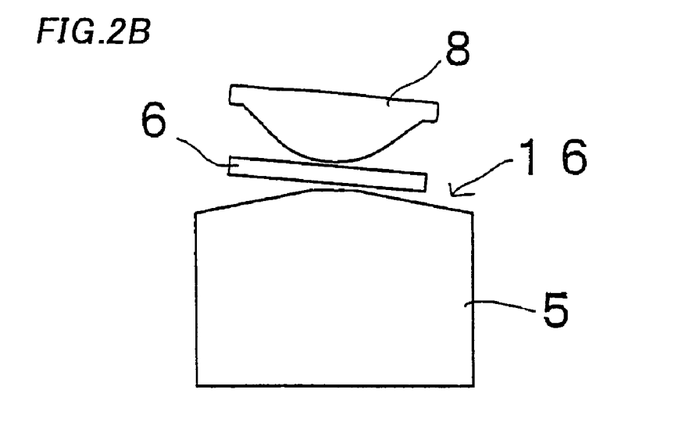
Figure 2C:
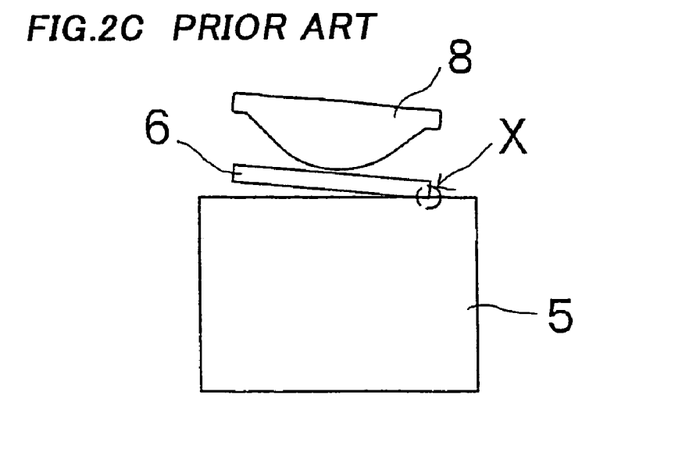
FIG. 2C shows a conventional structure.

The action of this embodiment will be described more specifically with reference to FIGS. 2A to 2C. FIGS. 2A to 2C correspond to FIG. 1C and show only the turning mirror 5, the opening-regulating filter 6 and the objective lens 8.

FIG. 2A shows a state where the stopper 9 and the stopper receiver 11 are in contact with each other and the tilting operation is not performed. FIG. 2B shows a case where the tilting operation is performed in the state of FIG. 2A. As shown in FIG. 2B, since the cutouts 16 are formed at both corners of the upper end of the turning mirror 5, contact between the opening-regulating filter 6 and the turning mirror 5 is avoided. Another stopper may be provided at the position of the maximum angle of the tilting operation to suppress the angle of a tilt. FIG. 2C shows the case where the conventional turning mirror is used. In this case, the opening-regulating filter 6 and the turning mirror 5 come into contact with each other in the position shown by X.

Figure 3A:
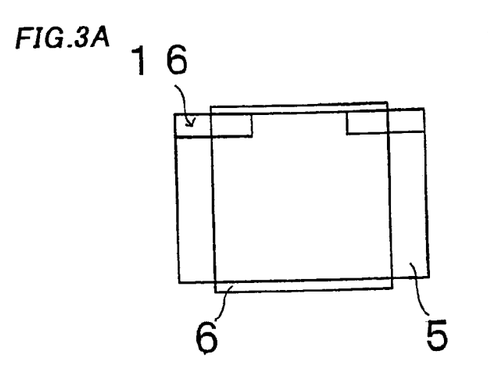
FIGS. 3A, 3B and 3C are a plan view, a side view and a front view, respectively, showing another embodiment of a turning mirror according to the present invention.
Figure 3B:
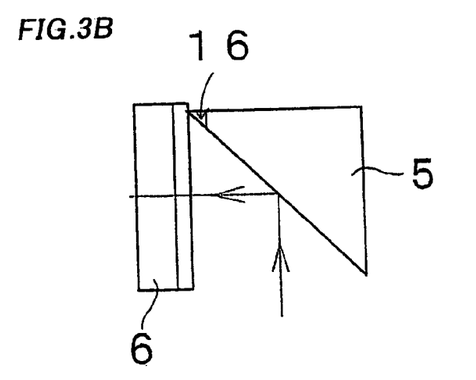
Figure 3C:
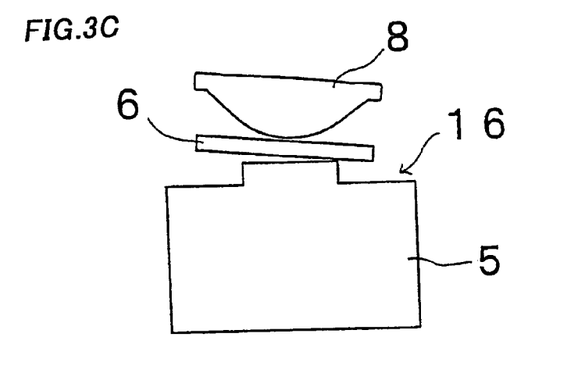

FIGS. 3A to 3C show another embodiment of the cutouts 16 formed at both of the corners of the upper end of the turning mirror 5. FIGS. 3A to 3C correspond to FIGS. 1A to 1C, respectively.

Figure 4A:
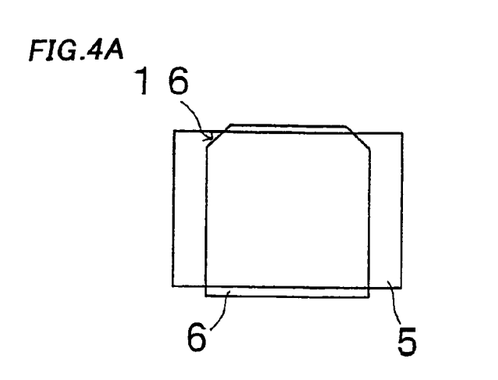
FIGS. 4A, 4B and 4C are a plan view, a side view and a front view, respectively, showing an embodiment of a opening-regulating filter according to the present invention.
Figure 4B:
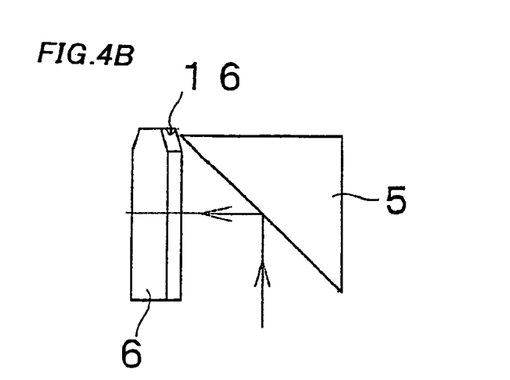
Figure 4C:
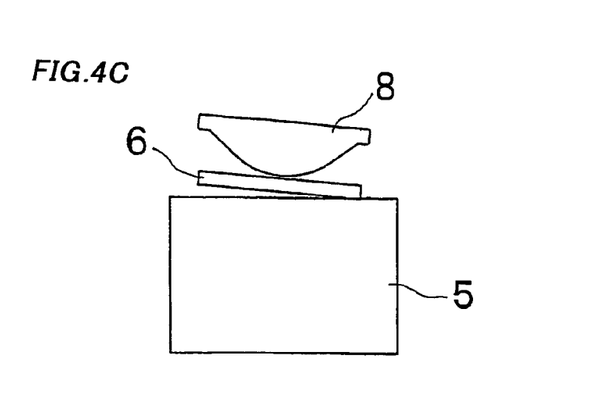

FIGS. 4A to 4C show an embodiment in which the cutouts 16 are formed at both corners of the opening-regulating filter 6 on the side closer to the upper end of the turning mirror 5. In this case as well, contact between the opening-regulating filter 6 and the turning mirror 5 is avoided. FIGS. 4A to 4C correspond to FIGS. 1A to 1C, respectively.

Figure 5A:
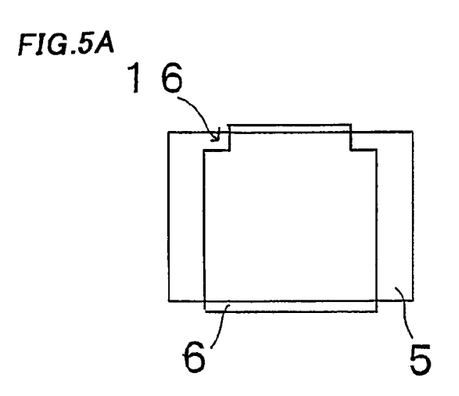
FIGS. 5A, 5B and 5C are a plan view, a side view and a front view, respectively, showing another embodiment of the opening-regulating filter according to the present invention.
Figure 5B:
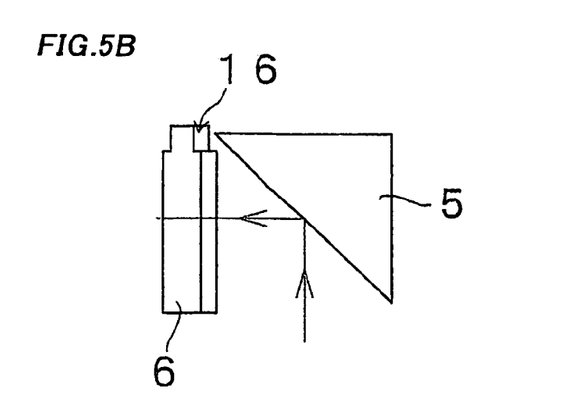
Figure 5C:
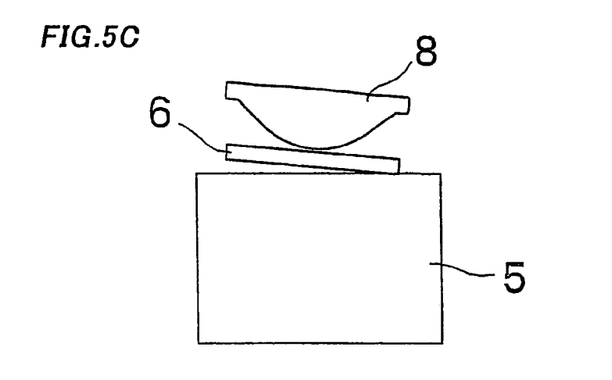

FIGS. 5A to 5C show another embodiment of the cutouts 16 formed at both of the corners of the opening-regulating filter 6. FIGS. 5A to 5C correspond to FIGS. 1A to 1C, respectively.

Figure 6A:
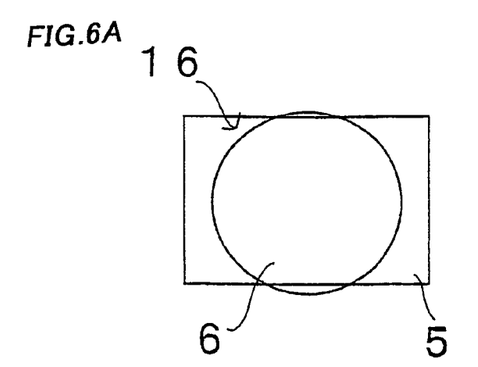
FIGS. 6A, 6B and 6C are a plan view, a side view and a front view, respectively, showing still another embodiment of the opening-regulating filter according to the present invention.
Figure 6B:
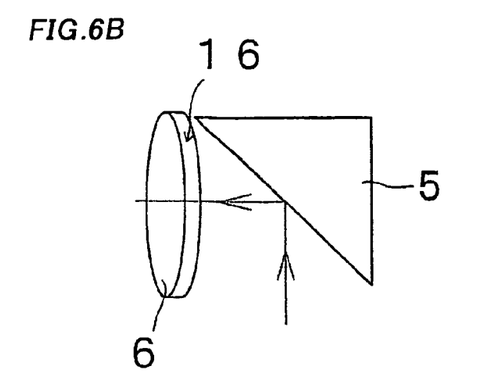
Figure 6C:
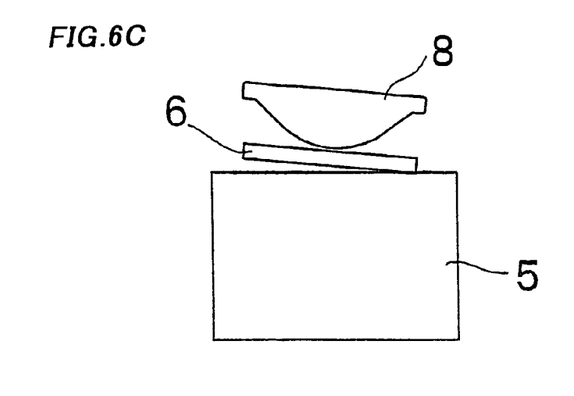

FIGS. 6A to 6C show an embodiment in which the opening-regulating filter 6 is formed in a disc shape. The cutout 16 has a circular arc shape. FIGS. 6A to 6C correspond to FIGS. 1A to 1C, respectively.

Figure 7A:
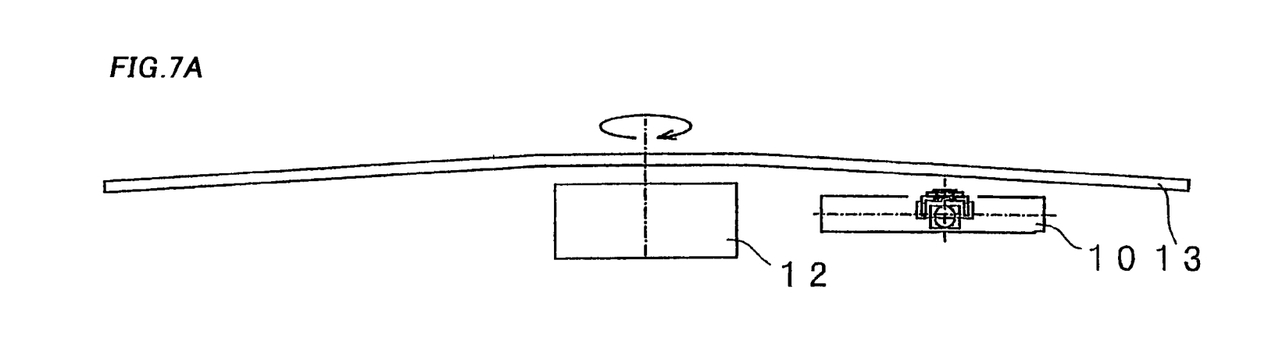
FIG. 7A illustrates a state where an optical information disc is deformed such that a cup-shaped warp occurs.
Figure 7B:
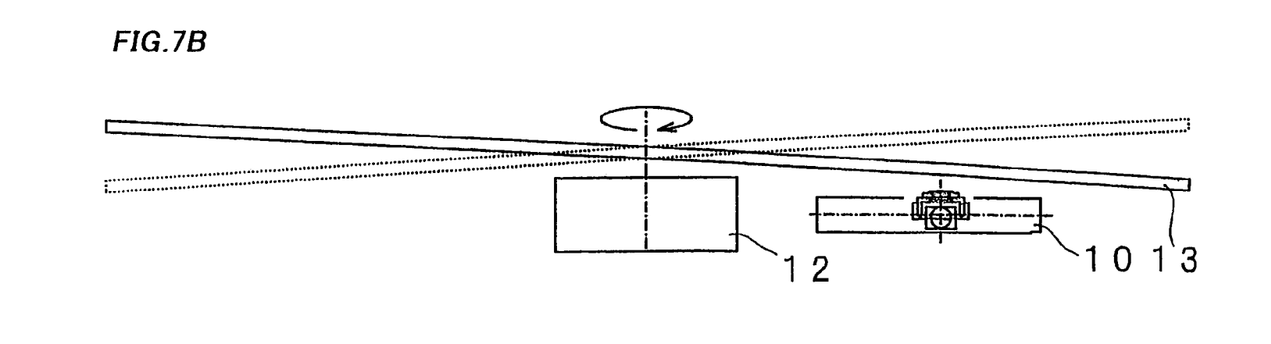
FIG. 7B illustrates a state where the optical information disc is deformed such that a face run-out occurs.

FIGS. 7A and 7B are diagrams showing a cup-shaped warp and a face run-out, respectively, of a medium-rotating-type optical information disc such as a CD or a DVD. As understood from the figures, since the position of the optical information disc is determined in its center, the influence of the warp and the run-out increases toward the outer periphery, and vertical motion necessary for the objective lens 8 to trace also increases. When attention is paid to the time when the disc is lowered, the direction of the tilting operation necessary for the objective lens 8 is basically the direction of lowering the outer periphery side as understood from FIGS. 7A and 7B.

Figure 7C:
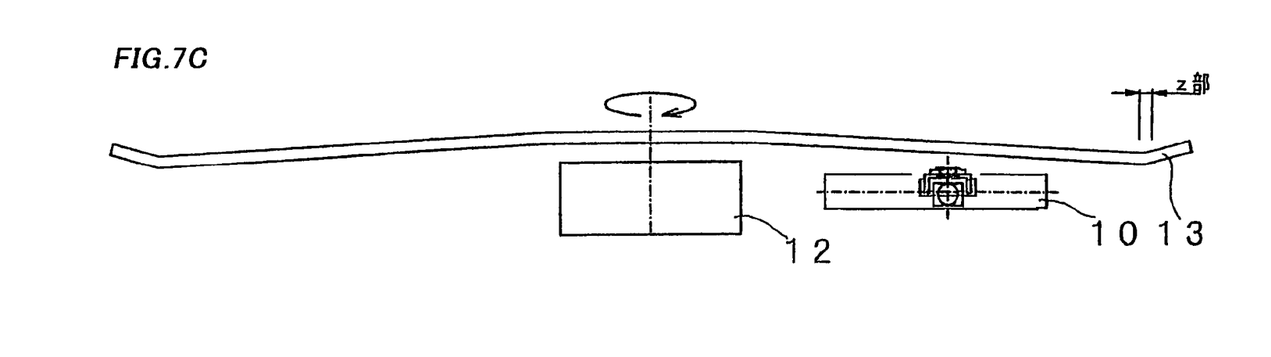
FIG. 7C illustrates an exception that the optical information disc is deformed in a tilting direction.

Geometrically, there may be an exception that the direction of tilt is opposite as shown by an example of a Z portion of FIG. 7C or local deformation. In reality, however, particularly after DVD, precision on the optical information disc side has been increased, and the exception that the objective lens 8 is lowered and the direction of the tilting operation becomes opposite does not occur. Therefore, it is sufficient to provide the cutout 16 only at the corner on the outer peripheral side of the upper end of the turning mirror. In this case, the manufacturing cost can be reduced.

Figure 8A:
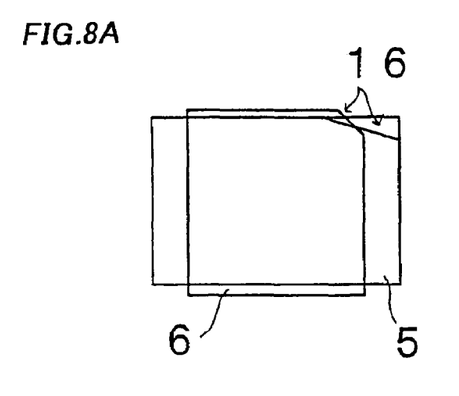
FIGS. 8A, 8B and 8C are a plan view, a side view and a front view, respectively, showing another embodiment of the turning mirror and the opening-regulating filter according to the present invention.
Figure 8B:
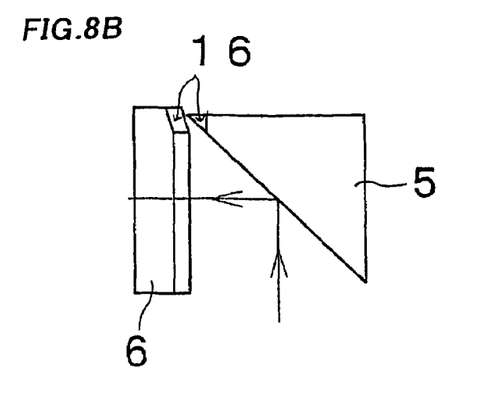
Figure 8C:
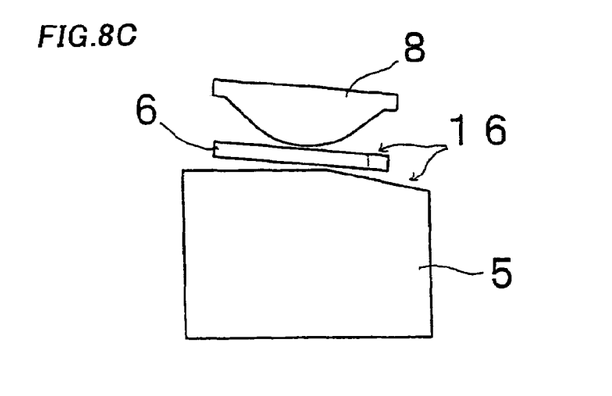

FIGS. 8A to 8C show a state where the cutouts 16 are formed in both of the turning mirror 5 and the opening-regulating filter 6. In this case, the size of each of the cutouts can be reduced and an allowance can be provided in optical design.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup device comprising:
    an objective lens;
    a wavelength-selecting opening-regulating filter disposed immediately below the objective lens;
    a holder for holding the objective lens and the opening-regulating filter;
    a tilting mechanism for tilting the holder in accordance with tilt of an optical information disc disposed above the objective lens;
    a focusing mechanism for vertically moving the holder in accordance with vertical fluctuations of the optical information disc;
    a turning mirror for guiding light beams from a light source toward the opening-regulating filter; and
    a housing for holding the turning mirror, wherein
    the holder has a stopper for regulating an amount of downward movement of the holder in the vicinity of a plane including the axisi of tilting operation of the tilting mechanism and center of the objective lens and at substantially the same height level as that of the opening-regulating filter,
    the housing has a stopper receiver which is paired with the stopper, and
    at least one of the opening-regulating filter and the turning mirror has a contact avoiding part for avoiding contact between the opening-regulating filter and the turning mirror, wherein
    the contact avoiding part is cutouts formed at both corners of the opening-regulating filter on the side closer to the upper end of the turning mirror.

2. The optical pickup device according to claim 1, wherein the opening-regulating filter has a disc shape, and the cutout in the opening-regulating filter has a circular arc shape.

3. An optical pickup device comprising:

an objective lens;

a wavelength-selecting opening-regulating filter disposed immediately below the objective lens;

a holder for holding the objective lens and the opening-regulating filter;

a tilting mechanism for tilting the holder in accordance with the tilt of an optical information disc disposed above the objective lens;

a focusing mechanism for vertically moving the holder in accordance with vertical fluctuations of the optical information disc;

a turning mirror for guiding light beams from a light source toward the opening-regulating filter; and a housing for holding the turning mirror, wherein the holder has a stopper for regulating an amount of downward movement of the hodler in the vicinity of a plane including the axis of tilting operation of the tilting mechanism and center of the objective lens and at substantially the same height level as that of the opening-regulating filter, the housing has a stopper receiver which is paired with the stopper, and at least one of the opening-regulating filter and the turning mirror has a contact avoiding part for avoiding contact between the opening-regulating filter and the turning mirror, wherein the device is supposed to use a medium-rotating-type optical information disc, and the contact avoiding part is a cutout formed only at a corner on the outer peripheral side of the upper end of the turning mirror.

* * * * *